United States Patent

[11] 3,617,119

[72] Inventor Armin B. Pagel
Janesville, Wis.
[21] Appl. No. 862,709
[22] Filed Oct. 1, 1969
[45] Patented Nov. 2, 1971
[73] Assignee Eastman Kodak Company
Rochester, N.Y.

[54] METHOD AND APPARATUS FOR AUTOMATICALLY FOCUSING FILM PROJECTORS
9 Claims, 2 Drawing Figs.

[52] U.S. Cl. .................................................... 352/140
[51] Int. Cl. .................................................... G03b 3/00
[50] Field of Search .......................................... 352/140;
353/69, 101

[56] References Cited
FOREIGN PATENTS
1,109,215  4/1968  Great Britain ................  352/140

Primary Examiner—S. Clement Swisher
Attorneys—Robert W. Hampton and William C. Dixon, III ABSTRACT: A device for automatically adjusting the focus of a film projector to compensate for film distortion caused by the sudden heating experienced by the film frame located in the projection gate as a result of absorption of radiant energy from the projection lamp. The distortion that each successive film frame will experience in the gate is predicted by measuring density characteristics of that frame before it arrives at the gate and the focus of the projector is adjusted accordingly in substantial synchronism with the movement of that frame into the gate.

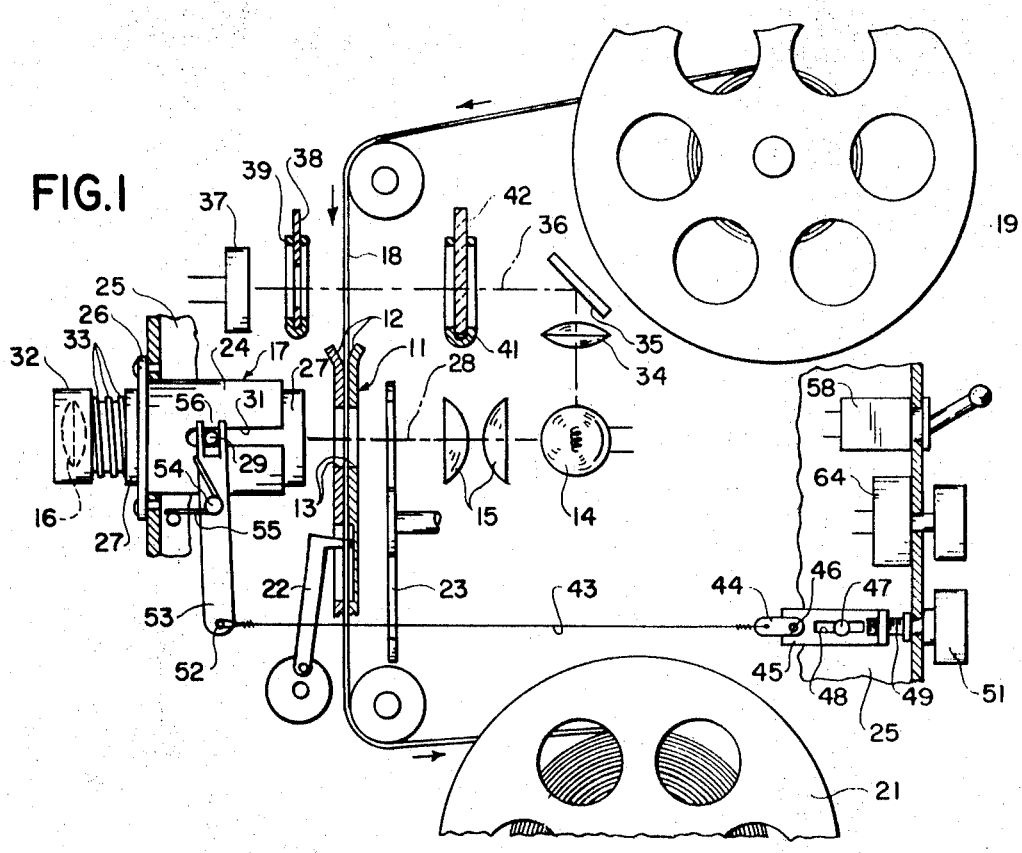

3,617,119

METHOD AND APPARATUS FOR AUTOMATICALLY FOCUSING FILM PROJECTORS

BACKGROUND OF THE INVENTION

1. Field of the Invention

The present invention relates to means for automatically adjusting the focus of film projectors to compensate for film distortion caused by the heating of the film frame located at the projection gate.

2. Description of the Prior Art

In conventional film projectors, the intense illumination to which the film is subjected in the projection gate causes it to distort out of its normally flat plane. This distortion generally warps the film transversely into a curved plane which is convex on the emulsion side of the film, thereby causing a major portion of the projected film frame to be displaced out of its original flat plane. Since the amount of heat absorbed by the film is related to the density of the film image, i.e. to the light-absorptive propensity of the image, the distortion of the film varies from frame to frame or from scene to scene. Accordingly, constant refocusing of the projection lens is required to maintain acceptable sharpness of the major portion of the projected film image.

In the past, many systems have been developed for measuring the distortion of the film frame located in the projection gate and for automatically adjusting the focus of the projector lens accordingly. A typical system of this type measures the distortion of the film frame within the projection gate by means of a beam of light which is reflected at an acute angle from one face of that film frame and which impinges on a photocell position-sensing device that controls the focus adjustment of the projection lens. Alternately, pneumatic means have also been proposed which similarly measure the distortion of the film frame within the gate by utilizing an air-gauging technique employing a jet of air directed against one face of that film frame by means of an optically transparent nozzle member. However, although different versions of such automatic focus compensating devices have enjoyed at least limited commercial acceptance in slide projectors, corresponding devices have not proven to be practicable in motion-picture projectors because of the very congested and inhospitable environment in which the distortion-sensing means must operate in that type of machine. To reduce this problem, the invention disclosed in commonly assigned U.S. Pat. application Ser. No. 599,244, entitled AUTOMATIC FOCUSING MOTION PICTURE PROJECTOR filed in the name of Miller Hutchison on Dec. 5, 1966, now U.S. Pat. No. 3,471,225, contemplates measuring film distortion in a motion-picture projector after the film has emerged from the projection gate. Since that system measures the distortion of a film frame which has already been projected, it obviously cannot provide focus correction on a continuous film-by-film basis. However, it does serve to compensate for most of the film distortion on a scene-by-scene basis due to the fact that the film distortion is substantially constant with regard to similar film frames having substantially identical density characteristics.

SUMMARY OF THE INVENTION

The present invention is based on the realization that since such film distortion is caused by the sudden heating of a film frame resulting from absorption of radiant energy in dense portions thereof, the amount of distortion which will result from exposure of a given film frame to illumination of constant intensity and to relatively constant ambient heating influences for a predetermined period of time is functionally related to the optical density characteristics of that particular film frame. Therefore, by measuring predetermined density characteristics of each film frame before it is projected, the subsequent distortion which that film frame will experience can be predicted and a corresponding focus adjustment can be effected upon arrival of that frame at the projection gate. Preferably, this is accomplished in accordance with the invention by projecting light through a film frame before it arrives at the projection site and measuring the transmitted light by means of a photocell. The electrical response of the photocell, which is functionally related to the measured density characteristics of the film, is then translated into an appropriate corresponding adjustment of the projector lens by means of an electrically operated device adapted to synchronize such adjustment of the lens with the arrival of that particular frame at the projection gate.

Various means for practicing the invention and other advantages and novel features thereof will be apparent from the following detailed description of an illustrative preferred embodiment of the invention, reference being made to the accompanying drawings in which like reference numerals denote like elements.

BRIEF DESCRIPTION OF THE DRAWINGS

In the accompanying drawings:

FIG. 1 is a diagrammatic illustration of the basic operative components of a motion-picture projector incorporating a preferred embodiment of the present invention, and FIG. 2 is a schematic diagram of the electrical circuit employed in the projector depicted in FIG. 1.

DESCRIPTION OF THE ILLUSTRATIVE PREFERRED EMBODIMENT

The motion-picture projector illustrated in FIG. 1 of the accompanying drawings employs a film gate 11 comprising a pair of platens 12 provided with opposed rectangular apertures 13 in alignment with projection lamp 14, condenser lenses 15 and projection lens 16 carried by lens support assembly 17. A strip of motion-picture film 18 is advanced intermittently through the film gate from film supply reel 19 to film takeup reel 21 by a conventional reciprocating pulldown claw 22 synchronized with the predetermined speed of rotation of a rotary shutter blade 23; thereby causing each successive film frame to be projected onto an appropriate projection screen.

Lens support assembly 17 comprises a tubular outer sleeve 24 which is rigidly mounted to the projector housing 25 by a flange 26. A tubular inner sleeve 27 is supported within the bore of sleeve 24 for sliding movement along the optical axis of the projection lens depicted by broken line 28 and is provided with a radial adjusting pin 29 projecting through longitudinal slot 31 in the outer sleeve. Lens support tube 32, which carries projection lens 16, is supported by the mating engagement of its external threads 33 with corresponding internal threads in inner sleeve 27, thus allowing the projection lens to be adjusted along its axis relative to the inner sleeve. Accordingly, the focal plane of lens 16 corresponding to a particular projection distance can be adjusted to coincide with the image plane of the film frame in the projection gate either by sliding inner sleeve 27 within outer sleeve 24 or by rotating the threaded lens support tube 32.

The automatic focusing system of the illustrated projector includes lens 34, which directs a beam of light from projection lamp 14 onto an oblique mirror 35. This mirror reflects the beam along a horizontal axis shown by broken line 36 so that it impinges on the particular reference frame of the film located at a sensing position above the projection gate. A photoresistive photocell 37 is located forwardly of the film along light beam axis 36 in front of an aperture member 38 removably supported in a support frame 39. A similar support frame 41, located rearwardly of the film, is adapted to support one or more interchangeable filter plates 42. Accordingly, the light which reaches the photocell from lamp 14 is modulated by filter plate 42 and by the light-absorbing characteristics of the monitored portion of the reference film frame aligned with the aperture of aperture member 38. By providing the projector with an appropriate aperture member and with one or more appropriate filter plates, a predetermined functional relation can therefore be established between the photoelectric response of the photocell and those particular density characteristics of the reference film frame which determine the amount of distortion which that frame will experience when it is located in projection position in the film gate. In other words, the resistance of the photoresistive photocell, which decreases as cell illumination increases, can thus be correlated with the distortion that the film will experience in proportion to its measured density characteristics.

Since the emulsion side of the film customarily faces forwardly in a motion-picture projector film gate, the distortion of the film can be expected to result in forward displacement of the central portion of the projected film frame. Therefore, the projection lens must be shifted forwardly by a corresponding distance to maintain the most important central area of the projected film image in acceptably sharp focus. To accomplish such adjustment of the projection lens, the illustrative embodiment of the invention includes an adjusting element comprising a wire or other conductor 43 having a relatively large coefficient of thermal expansion and relatively high electrical resistivity; e.g. a wire made of the material commonly known as Nichrome. At its rearward end, wire 43 is attached to an insulator link 44 connected to slide plate 45 by pin 46. The slide plate, in turn, is slideably mounted to the projector housing by rivet 47 extending through slot 48 and can be adjusted along the direction of the wire by an adjusting screw 49 operated by external knob 51. The opposite end of wire 43 is connected to pin 52 at the lower end of an adjusting lever 53, which is pivotally supported by a central support stud 54 and biased in a clockwise direction by a hairpin spring 55. At its upper end, lever 53 is provided with a slot 56 which receives pin 29 carried by inner sleeve 27 of the lens support assembly 17. Consequently, the position of inner sleeve 27 along optical axis 28 is adjustable by knob 51 and also changes in accordance with the length of wire 43, which varies as a function of the current flowing therethrough. In other words, as the current flowing through wire 43 is increased, the projection lens is moved rearwardly and vice versa.

As shown in FIG. 2 of the drawings, which schematically depicts the electrical circuit of the illustrative projector, alternating line current is supplied to the machine by plug 57 which is connected in series with switch 58, projection lamp 14, projector drive motor 59 and voltage-reducing transformer 61. The relatively low voltage output of transformer 61 is rectified by rectifier 62 to supply direct current to a generally conventional direct current amplifier unit 63 which is controlled by the photoresistive photocell 37 to provide an electrical output current inversely proportional to the resistance of the photocell. The output current delivered by the amplifier unit is conducted through wire 43 and through a variable resistor 64 in series therewith. Consequently, the length of wire 43, which is determined by its temperature, is related inversely to the resistance of the photocell in accordance with the adjustment of the variable resistor 64. If the monitored portion of the reference frame of film at the sensing position is very dense, which indicates that that frame will undergo substantial distortion in the film gate, the corresponding low illumination of the photocell will cause its resistance to remain high. Therefore, wire 43 will be relatively cold and correspondingly contracted and will maintain lens 16 forwardly. Conversely, if the monitored portion of the reference film frame is highly transparent, the resulting high level of illumination of the photocell causes the wire to become hot and correspondingly elongated so that the projector lens moves rearwardly under the influence of spring 55. By the use of an appropriate aperture member 38 and filter plate 42 and by proper adjustment of adjusting screw 49 and variable resistor 64, the movement of the lens by wire 43 can therefore be correlated with the predicted distortion of the film frame to substantially maintain the sharp focus of the projection lens initially established by manual rotation of the lens support tube 32.

Since the defocusing of any given film frame occurs within the film gate, it will be apparent that the defocusing correction response of the subject apparatus must be delayed by a time interval corresponding to the time required for each frame to move from the reference position to the projection position. This requirement is satisfied in the illustrative projector simply by designing the lens adjusting system such that the time required for the temperature of wire 43 to respond to variations in the heating current corresponds substantially to the required time delay. Therefore, the resulting defocusing correction does not occur instantaneously in precise synchronization with the arrival of each film frame at projection position, but nevertheless achieves substantial synchronization between the defocusing correction and the occurrence of the film distortion. If desired, it obviously would be possible to employ substantially instantaneous electrically controlled adjusting means in place of wire 43 and to provide the required response delay by means of a delay circuit incorporated in conjunction with amplifier unit 63. Such an arrangement, for example, would be particularly appropriate for use in a variable-speed motion-picture projector, in which case the time delay could be adjusted automatically in accordance with film projection speed.

Because the distortion which occurs in any given film frame varies in accordance with the distribution and spectral characteristics of high-density regions in the recorded image, it will be apparent that the monitored film area defined by aperture member 38 will not always provide a precise prediction of subsequent distortion due to the fact that photocell 37 can only integrate the overall density of the film image within that film area but cannot actually analyze the character and distribution of localized regions of the film image. For most applications the correction provided by the illustrated apparatus is entirely adequate, but it should be noted that a more accurate prediction of film distortion could be achieved in a highly sophisticated film projector by the use of an optical scanner and computer system analogous to similar known systems employed in color film printing equipment.

Although the invention is particularly applicable to motion-picture projectors, and has been described in that context, it should be appreciated that the invention also contemplates the use of similar means for predicting and compensating for film distortion in slide projectors or other types of projectors in which such film distortion is encountered in a projection gate.

The invention has been described in detail with particular reference to an illustrative preferred embodiment thereof, but it will be understood that variations and modification can be effected within the spirit and scope of the invention.

I claim:
1. For use in a film projector including:
   a. a projection gate adapted to support a film frame,
   b. film-transporting means for moving a film frame along a predetermined path into said gate,
   c. a light source for illuminating a film frame supported in said gate, and
   d. a projection lens for focusing a projected image of the illuminated film frame in said gate at a predetermined projected image plane; an automatic focusing apparatus for substantially correcting defocusing of the projected image of a film frame located in said gate which occurs as a result of distortion of said frame due to its absorption of radiant energy from said light source, said apparatus comprising
   e. density-measuring means for measuring a distortion determinative density characteristic of a film frame located at a predetermined sensing position along said path and for providing an output functionally related to such measurement,
   f. focus-adjusting means automatically responsive to the output of said density-measuring means for effecting focusing adjustment of the distance between said projection lens and said film gate as a function of such output, and
   g. delay means for delaying the focus-adjusting response of said focus-adjusting means to said output to substantially synchronize said focusing adjustment with the occurrence of the distortion experienced by the corresponding film frame upon illumination thereof in said gate.

2. The invention defined by claim 1 in which said density-measuring means comprises:
   a. illumination means for impinging a beam of light of substantially constant intensity on a film frame located at said sensing position and
   b. photoresponsive means for measuring the absorption by the film frame at said sensing position of light impinged thereon by said illumination means and for providing said output as a function of such absorption.

3. The invention defined by claim 2 in which said beam of light originates at said light source.

4. The invention defined by claim 2 in which said photoresponsive means comprises a photocell adapted to be illuminated by light from said beam transmitted through a frame of film located at said predetermined sensing position.

5. The invention defined by claim 2 including monitored area defining means limiting the measurement of said density characteristic to a predetermined region of the film frame located at said sensing position.

6. The invention defined by claim 2 including a light-filtering means for modulating the response of said density-sensing means in accordance with predetermined spectral criteria.

7. The invention defined by claim 1 including:
   a. lens support means supporting said projection lens for focus-adjusting movement and
   b. means comprising said focus-adjusting means including
      i. electrical means for producing an electrical current functionally related to said output of said density-measuring means and
      ii. electrically operated movement producing means operatively connected to said lens support means and controlled by said electrical current for moving said projection lens to adjust the focus thereof as a function of the distortion determinative density characteristic measured by said density-measuring means.

8. The invention defined by claim 7 in which said electrically operated movement-producing means includes:
   a. an elongate wire having relatively high resistive and thermal expansion characteristics,
   b. conductor means for conducting said electrical current through said wire, and
   c. linkage means for translating into focus-adjusting movement of said projection means variations in the length of said wire produced by changes in its temperature determined by corresponding changes in said electrical current passing therethrough.

9. The method of correcting defocusing of a projection lens in a film projector to compensate for thermal distortion experienced by a film frame positioned within the film projection gate of said projector as a result of absorption by that film frame of radiant energy from a source of projection illumination, said method comprising the steps of
   a. measuring a predetermined light-absorptive characteristic of said film frame before said film frame is moved into said gate,
   b. predicting from that measurement the distortion that will be experienced by said film frame under the illumination influence to which it will be subjected within said gate to determine the necessary focus adjustment required to maintain sharp focus of said film frame after such distortion thereof has occurred in said gate, and
   c. effecting the focus adjustment so predicted in predetermined timed relation to the movement of said film frame into said projection gate.

* * * * *